United States Patent
Kim et al.

(10) Patent No.: US 7,755,228 B2
(45) Date of Patent: Jul. 13, 2010

(54) DIRECT DRIVE MOTOR IN WASHING MACHINE

(75) Inventors: Hyeok Deok Kim, Changwon-si (KR); Yeon Su Jung, Changwon-si (KR)

(73) Assignee: LG Electronics Inc., Seoul (KR)

( * ) Notice: Subject to any disclaimer, the term of this patent is extended or adjusted under 35 U.S.C. 154(b) by 491 days.

(21) Appl. No.: 10/562,670

(22) PCT Filed: Nov. 8, 2005

(86) PCT No.: PCT/KR2005/003764

§ 371 (c)(1),
(2), (4) Date: May 29, 2007

(87) PCT Pub. No.: WO2006/052073

PCT Pub. Date: May 18, 2006

(65) Prior Publication Data

US 2008/0067879 A1    Mar. 20, 2008

(30) Foreign Application Priority Data

Nov. 9, 2004   (KR)  ....................... 10-2004-0090810
Nov. 19, 2004  (KR)  ....................... 10-2004-0095071

(51) Int. Cl.
*H02K 1/30* (2006.01)
(52) U.S. Cl. .................... 310/43; 310/51; 310/75 R
(58) Field of Classification Search ............... 310/51, 310/43, 75 R; 68/140
See application file for complete search history.

(56) References Cited

U.S. PATENT DOCUMENTS 5,825,108 A * 10/1998 De Filippis ................ 310/67 R
5,907,206 A *  5/1999 Shiga et al. ............. 310/156.05
6,148,647 A * 11/2000 Kabeya et al. ................ 68/140

(Continued)

FOREIGN PATENT DOCUMENTS

JP          2002-238227 A       8/2002

(Continued)

*Primary Examiner*—Quyen Leung
*Assistant Examiner*—Naishadh N Desai
(74) *Attorney, Agent, or Firm*—Birch, Stewart, Kolasch & Birch, LLP (57) ABSTRACT

An object of the present invention is to provide a direct drive motor in a washing machine, in which a structure of a driving unit in a washing machine is improved to improve processability, and current flow down to the washing shaft is cut off even if insulation between the winding portion of the stator and the rotor is broken, for preventing accidents caused by negligence of safety from taking place.

To achieve the object of the present invention, the present invention provides a direct drive motor in a washing machine includes a stator 14 having a winding portion with coils wound thereon, a rotor 13 fixedly connected to a washing shaft 4 for direct drive of a drum, the rotor 13 having a sidewall 13b, and a rear wall 13a with a pass through hole 131 at a center, and a connector 16 of a material having a vibration mode different from the washing shaft, insert molded at the center of the rear wall 13a of the rotor to form one body with the rotor, and fixedly connected to the washing shaft to connect the rotor to the washing shaft, and support the washing shaft.

20 Claims, 7 Drawing Sheets

U.S. PATENT DOCUMENTS

| | | | |
|---|---|---|---|
| 6,460,382 B1 * | 10/2002 | Kim et al. | 68/140 |
| 6,474,114 B1 * | 11/2002 | Ito et al. | 68/140 |
| 6,546,762 B2 * | 4/2003 | Koshiga et al. | 68/23.7 |
| 2005/0210604 A1 | 9/2005 | Schmid et al. | |

FOREIGN PATENT DOCUMENTS

| | | |
|---|---|---|
| WO | WO-98/00902 A1 | 1/1998 |
| WO | WO-02/077352 A2 | 10/2002 |

* cited by examiner

DIRECT DRIVE MOTOR IN WASHING MACHINE

TECHNICAL FIELD

The present invention relates to washing machines, and more particularly, to a direct drive motor applicable to a drum type washing machine, and the like.

BACKGROUND ART

In general, a pulsator type washing machine performs washing under the control of a microcomputer for removing dirt from clothes, and beddings by using a softening action of detergent, friction of water circulation following rotation of a pulsator, and impact of the pulsator to laundry, after kind and amount of laundry is detected with a sensor, to set a washing method automatically accordingly, and washing water is supplied to a proper level according to the kind and amount of the laundry.

On the other hand, the drum type washing machine, washing laundry by using friction between laundry and drum rotated by driving force of a motor in a state the detergent, washing water, and the laundry are introduced into the drum, gives almost no damage to the laundry, causes no entangling of the laundry, and provides a washing effect of pounding and rubbing the laundry.

A related art drum type washing machine will be described briefly with reference to FIG. 1.

Figure 1:
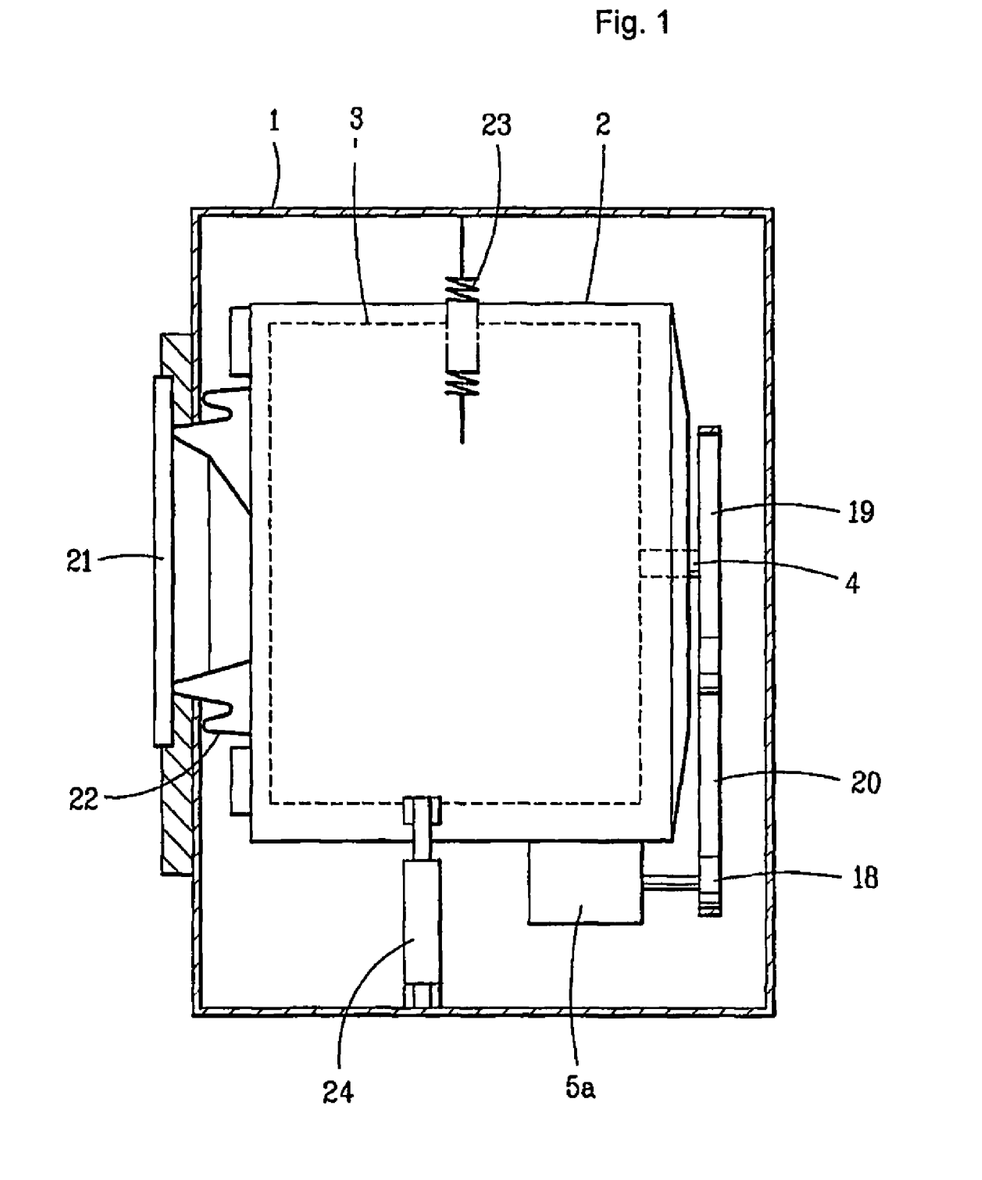
FIG. 1 illustrates a diagram of a related art direct drive drum type washing machine, schematically.

FIG. 1 illustrates a longitudinal section of a related art drum type washing machine, provided with a tub 2 in a cabinet 1, and a drum 3 rotatably mounted at a central portion of the tub 2.

Under the tub 2, there is a motor 5a having a motor pulley 18 coupled thereto through a shaft, and, in a rear of the drum 3, there is a drum shaft mounted thereon having a drum pulley 19 coupled thereto.

According to this, as the drum pulley 19 on the drum shaft and the motor pulley 18 coupled to the motor 5a are connected through a belt 20, a power transmission element, for transmission of driving force from the motor to the drum 3 through the belt 20.

Mounted on a front of the cabinet 1, there is a door 21, with a gasket 2 mounted between the door 21 and a tub 2.

In the meantime, between an underside of an upper portion of the cabinet 1 and an upper side of an outside circumference of the tub 2, there are hanging springs 23 for suspending the tub, and between a bottom of the cabinet 1 and a lower side of the outside circumference of the tub 2, there are dampers 24 for attenuating vibration of the tub 2 taking place at the time of spinning.

However, the related art washing machine has the following drawback since the related are washing machine has a structure in which the driving force is transmitted from the motor 5a to the drum 3 through the motor pulley 18, the drum pulley 19, and the belt 20 connecting the motor pulley 18 and the drum pulley 19.

First of all, because the driving force is transmitted to the drum 3, not directly, but through the belt 20 wound on the motor pulley 18 and the drum pulley 19, an energy loss takes place in a course of driving force transmission.

Moreover, because the driving force is transmitted to the drum 3, not directly, but through many components, such as the motor pulley 18, the drum pulley 19, the belt 20, and so on, much noise is generated in the power transmission.

The many components, such as the motor pulley 18, the drum pulley 19, the belt 20, and so on, required for transmission of the driving force of the motor 5a to the drum 3 cause to increase an assembly man-hours of the product.

Moreover, the many components required for transmission of the driving force of the motor 5a to the drum 3 increase a number and frequency of faults.

In short, the indirect transmission of the driving force from the motor 5a to the drum 3 by using the motor pulley, the drum pulley, and the belt is liable to cause trouble and noise, has many energy waste factors, and impairs washing capability.

Along with this, the tub 2 of stainless steel of the related art drum type washing machine costs high, has a poor processability, and is heavy.

In the meantime, instead of the indirect transmission of the driving force from the motor to the drum by using the belt and pulleys, though a direct drive drum type washing machine system has been introduced, the system has a drawback in that a stator directly secured to a rear wall of the tub fails to maintain concentricity of the stator due to damage or deformation of a fastening portion caused by vibration of the motor.

Moreover, in order to solve above problem, in a case a bearing housing is fabricated separate from the tub, not only assembly is difficult, but also the assembly occupies a large space as an entire bearing housing projects from the tub. In a case the bearing housing is fastened with screws or bolts, since the bearing housing is supported, not entirely, but only partially at one side thereof, the fastening is susceptible to vibration. Moreover, since a complicate water protection structure is required not only for the bearing itself, but also between the tub and the bearing, the structure has drawback in fabrication.

Together with this, the bearing housing is required to have an inner collar and an outer collar which are separate components for supporting the bearing mounted therein, and fabrication of the rotor is very difficult because of individual permanent magnets, steel plate, and a back yoke at a back side of the steel plate.

In the meantime, the direct drive drum type washing machine is liable to insulation between a winding portion of the stator and the rotor broken to cause a current to flow to the washing water in the tub, and has a problem in that the separate fabrication and mounting of the connector for transmission of rotation from the rotor to the washing shaft drops processability in an assembly line and productivity.

DISCLOSURE

Technical Problem

An object of the present invention is to provide a direct drive motor in a washing machine, in which a structure of a driving unit in a drum type washing machine is improved such that a driving force is transmitted from the motor to the drum directly, for reducing noise, fault, and factors of energy waste, and current flow down to the washing shaft is cut off even if the insulation between the winding portion of the stator and the rotor is broken, for preventing accidents caused by negligence of safety from taking place.

Another object of the present invention is to provide a direct drive motor in a washing machine, in which separate mounting of a connector is not required in fabrication of the rotor, to improve productivity and safety.

Technical Solution

The object of the present invention can be achieved by providing a direct drive motor in a washing machine including a stator 14 having a winding portion with coils wound thereon, a rotor 13 fixedly connected to a washing shaft 4 for direct drive of a drum, the rotor 13 having a sidewall 13b, and a rear wall 13a with a pass through hole 131 at a center, and a connector 16 of a material having a vibration mode different from the washing shaft, insert molded at the center of the rear wall 13a of the rotor to form one body with the rotor, and fixedly connected to the washing shaft to connect the rotor to the washing shaft, and support the washing shaft.

Preferably, the rotor 13 is constructed of steel plate by pressing to form the side wall 13b and the rear wall 13a as one body. Preferably, the pass through hole 131 at a center of the rear wall 13a of the rotor 13 is formed at a center of a hub 132 which is a portion projected in a stator side or in a direction opposite thereto with respect to neighboring surface.

Preferably, the connector 16 is formed of resin for insulating between the washing shaft 4 and the rotor 4 even if the washing shaft 4 is formed of metal, which is conductive to electricity.

Preferably, the connector 16 includes a serration 164 on an inside circumferential surface having a shape in conformity with a shape of a serration 400 at a rear end portion of the washing shaft 4. The connector 16 further includes reinforcing ribs 161 for reinforcing strength of the connector 16.

Preferably, the rotor 13 includes at least one communication hole in a neighborhood of the pass through hole 131 for enhancing bonding force between the connector 16 of resin and the rotor at the time of insert molding of the connector, for firm bonding between the rotor 13 and the connector 16.

The connector 16 may be insert molded in the rotor such that the connector 16 covers an inside of the pass through hole 131 and front and rear surfaces of neighborhood of the pass through hole 131 of the rotor. The pass through hole 131 in the rotor 13 has a bonding piece 210 projected in a length direction of the washing shaft 4 for enhancing bonding force between the connector 16 of resin and the rotor 13 at the time of insert molding of the connector.

The rear wall 13b has at least one bonding piece 211 around the pass through hole 131 in the rotor 13 projected in a length direction of the washing shaft 4 for enhancing bonding force between the connector 16 of resin and the rotor 13 at the time of insert molding of the connector.

In another aspect of the present invention, a direct drive motor in a washing machine includes a stator 14 having a winding portion with coils wound thereon, a rotor 13 fixedly connected to a washing shaft 4 for direct drive of a drum, the rotor 13 having a sidewall 13b, and a rear wall 13a formed as one body by pressing steel plate, with a pass through hole 131 at a center of the rear wall 13a, and a connector 16 of resin insert molded such that the connector 16 is bonded on inner, and outer sides of the rear wall 13a of the rotor including communication holes 137 therein to form one body with the rotor, and fixedly connected to the washing shaft to connect the rotor to the washing shaft, and support the washing shaft.

In another aspect of the present invention, a direct drive motor in a washing machine includes a stator 14 having a winding portion with coils wound thereon, a rotor 13 of magnetic metal fixedly connected to a washing shaft 4 of metal for direct drive of a drum, the rotor 13 having a sidewall 13b, and a rear wall 13a with a pass through hole 131 at a center, and a connector 16 of resin for insulating between the washing shaft and the rotor, insert molded at the center of the rear wall 13a of the rotor 16 to form one body with the rotor, and connect the washing shaft to the rotor.

ADVANTAGEOUS EFFECTS

The direct drive motor in a washing machine of the present invention has the following advantages.

The direct drive motor permits to provide a drum type washing machine having less noise, faults, and power loss, and the rotor of steel plate enabling pressing with good processability to require a shorter fabrication time period permits to provide a drum type washing machine having an improved productivity.

The connector having a vibration mode different from the rotor permits to reduce vibration from the rotor to the washing shaft, and the resin of the connector insulates between the rotor and the washing shaft even if both the rotor and the washing shaft are formed of metal which is conductive, thereby preventing accidents of electric shock from taking place in advance.

Especially, the fabrication of the rotor and the connector as one body by means of insert molding permits to reduce an number of components, and assembly man-hours, to improve productivity.

DESCRIPTION OF DRAWINGS

The accompanying drawings, which are included to provide a further understanding of the invention, illustrate embodiment(s) of the invention and together with the description serve to explain the principle of the invention. In the drawings.

BEST MODE

Reference will now be made in detail to the preferred embodiments of the present invention, examples of which are illustrated in the accompanying drawings FIGS. 2 to 11.

Figure 2:
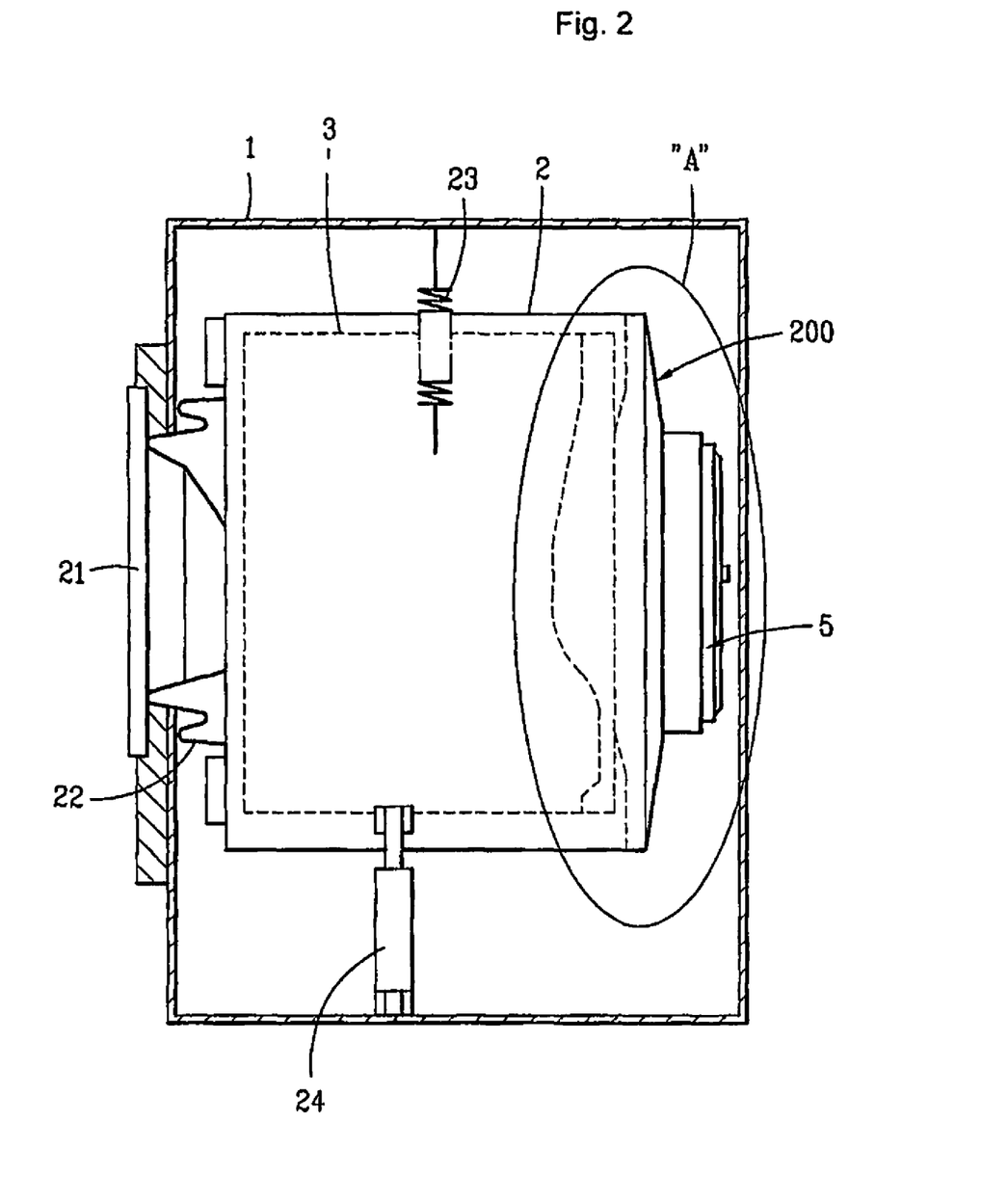
FIG. 2 illustrates a diagram of a direct drive drum type washing machine in accordance with a preferred embodiment of the present invention.
Figure 3:
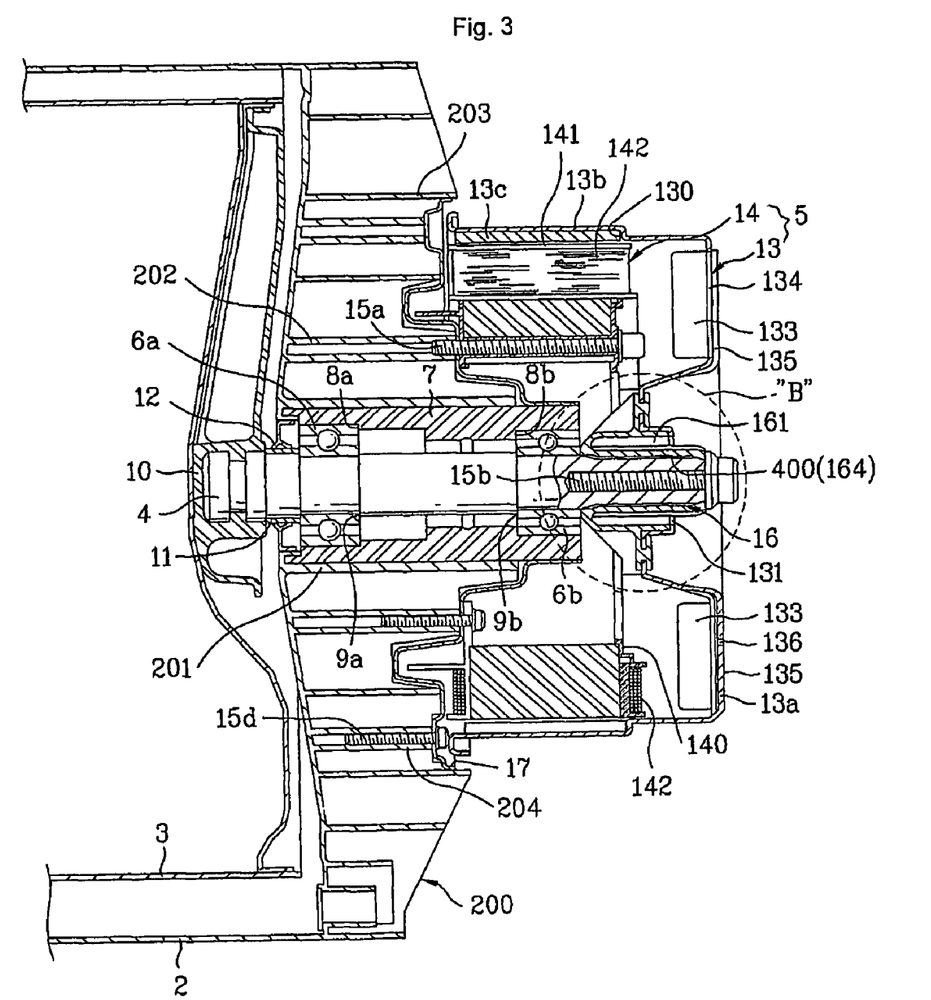
FIG. 3 illustrates a longitudinal section of "A" part in FIG. 2 showing a driving unit of the drum type washing machine in accordance with a preferred embodiment of the present invention.
Figure 4:
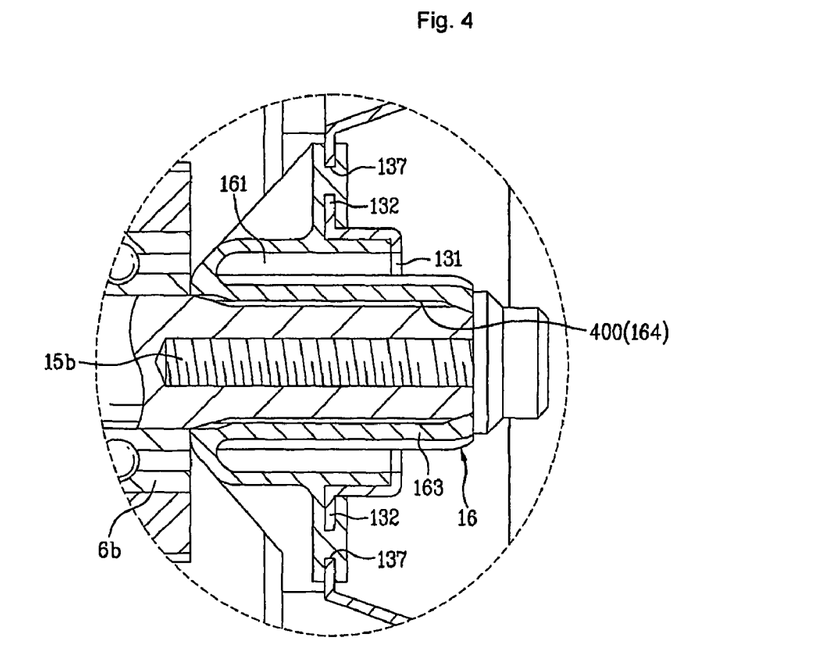
FIG. 4 illustrates an enlarged view of "B" part in FIG. 3.

FIG. 2 illustrates a diagram of a direct drive drum type washing machine in accordance with a first preferred embodiment of the present invention, FIG. 3 illustrates a diagram showing detail of "A" part in FIG. 2, FIG. 4 illustrates an enlarged view of "B" part in FIG. 3.

Figure 5:
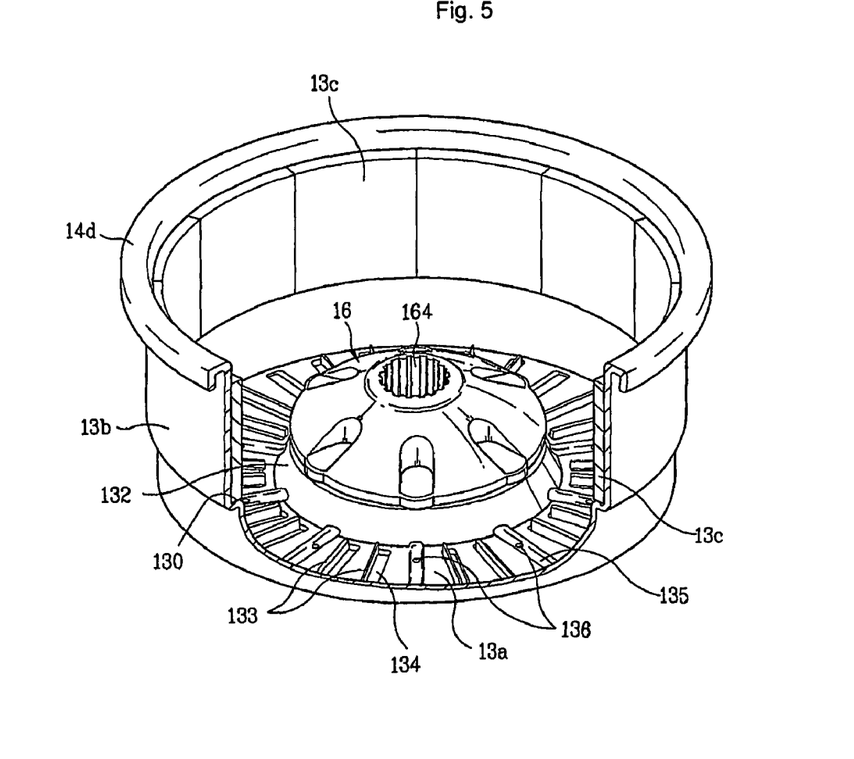
FIG. 5 illustrates a perspective view of the rotor in FIG. 3, with a partial cut away view.
Figure 6:
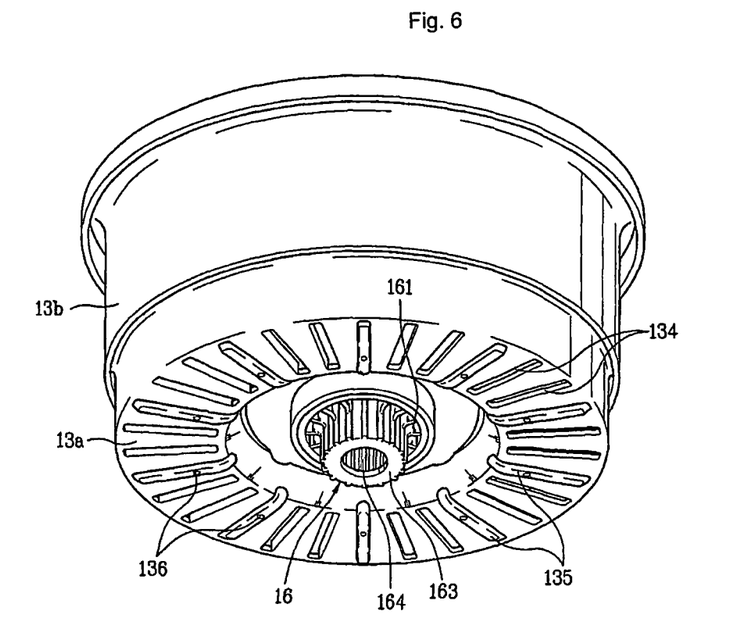
FIG. 6 illustrates a bottom perspective view of FIG. 5.
Figure 7:
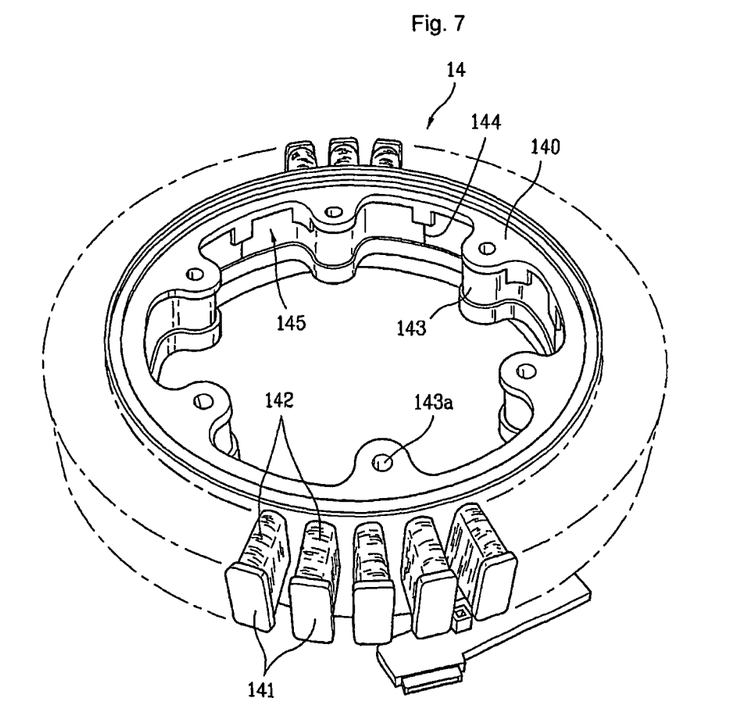
FIG. 7 illustrates a perspective view of the stator in FIG. 3.

FIG. 5 illustrates a perspective view of the rotor in FIG. 3, with a partial cut away view, FIG. 6 illustrates a bottom perspective view of FIG. 5, and FIG. 7 illustrates a perspective view of the stator in FIG. 3.

The drum type washing machine in accordance with the embodiment includes a tub 2 in a cabinet 1, a drum 3 in the tub 2, a washing shaft 4 connected to the drum 3 for transmission of a driving power from a motor 5 to the drum 3, and bearings on an outside circumferential surface of opposite ends of the washing shaft 4.

The tub 2 is formed of plastic, and a bearing housing 7 of metal is provided to a center of a rear wall 200 of the tub 2 for supporting the bearings on the outside circumferential surface of opposite ends of the washing shaft 4.

The metal bearing housing 7 is inserted in injection molding of the plastic tub 2 such that the bearing housing 7 becomes one body with the tub 2 at the rear wall thereof.

It is preferable that the bearing housing 7 is formed of aluminum.

In the meantime, the bearing housing 7 has steps 8a and 8b on an inside circumferential surface of the bearing housing 7 for supporting a front bearing 6a and a rear bearing 6b, and preventing the bearings from falling off the bearing housing 7, respectively.

Of the steps 8a and 8b on an inside circumferential surface of the bearing housing 7, the step 8a at a front side has a "]" shape to form a structure for supporting a rear end of the front bearing 6a, and the step 8b at the rear side has a "[" shape to form a structure for supporting a front end of the rear bearing 6b.

On an outside circumferential surface of the washing shaft 4 in the bearing housing 7 for transmission of a driving power from the motor 5 to the drum 3, there are positioning steps 9a and 9b at a front side and a rear side thereof, for positioning the front bearing 6a and the rear bearing 6a on the washing shaft 4.

The washing shaft 4 also has a front end fixedly secured to a spider 10 on the rear wall of the drum 3, a brass bushing 11 press fit on a region of the washing shaft 4 starting from an exposed portion of the washing shaft 4 in rear of the spider 10 to the front bearing 6a for preventing the washing shaft 4 from rusting, and a sealing member 12 on an outer side of the bushing 11 for preventing infiltration of water.

In the meantime, there are a rotor 13 of the direct drive motor 5 coupled to a center of a rear end portion of the washing shaft 4, and a stator 14 of the direct drive motor 5 on an inner side of the rotor 13 secured to the rear wall 200 of the tub 2.

Referring to FIGS. 5 to 7, the rotor 13, preferably constructed of steel plate, includes a sidewall 13b extended forward from a circumference of a rear wall 13a, having a bent portion formed along a circumferential direction, with a seating surface 130 for supporting magnets 13c mounted on an inside circumferential surface of the side wall 13a, and a hub 132 at a center of the rear wall 13a, with pass through holes 131 formed therein for pass through of thread portions of fastening members 15b, such as bolts, to couple the rotor 13 to the washing shaft 4.

It is preferable that the rotor 13 is formed by pressing.

Around the hub 132 of the rotor 13, there are a plurality of cooling fins 133 formed in a radial direction for blowing air toward the stator 14 when the rotor 13 is rotated to cool down heat from the stator 14, each with a predetermined length in the radial direction.

The cooling fins 133 are formed by lancing, such that the cooling fins 133 are bent 90° from the rear wall toward opened portion, and pass through hole 134 formed by the lancing serve as vents.

Along with this, there are embossed portions 135 between adjacent cooling fins 133 on the rear wall 13a of the rotor 13 for reinforcing the rotor 13, each with a drain hole 136 for draining water.

The rotor 13 has a pass through hole 131 at a center of the hub 132, and a connector 16 of resin, having a vibration mode different from the washing shaft 4, is insert molded as one body with the rotor 13 on a periphery of the pass through hole 131.

Accordingly, the rotor 13 and the connector 16, fabricated as one body, require no more assembly at the time of assembly of the drum type washing machine at the site to improve productivity.

It is preferable that a straight portion of the pass through hole 131 is formed in a pass-through direction of the pass through hole 131, i.e., in the same direction of a length direction of the washing shaft actually, in front/rear direction.

For enhancing a bonding force between the resin and the rotor 13 at the time of the insert molding of the connector 16, it is preferable that at least one communication hole 137 is formed around the pass through hole 131 of the rotor 13.

The connector 16 has a serration 164 on an inside circumferential surface of the hub 163 in conformity with the serration 400 on the rear end of the washing shaft 4, and reinforcing ribs 161 on an outer side of hub 163 of the connector 16 for reinforcing the hub 163.

The connector 16 formed of resin having a vibration mode different from the rotor 13 of steel plate suppresses transmission of vibration from the rotor to the washing shaft 4, and serves as a bushing for the rotor.

The material of the rotor is not limited to steel plate, but may be other magnetic metal. In general, the washing shaft is also formed of metal, taking strength and processability into account.

Therefore, in a case the insulation is broken between the stator having the winding portion having coils wound thereon for flow of a current and the rotor rotating by electromagnetic action with the stator, the current is liable to flow to the washing shaft, to cause an electric shock through the washing water in the tub at the end.

However, referring to FIGS. 3 to 6, since the connector 16 of resin, i.e., an insulating material, cuts off electric connection between the washing shaft 4 and the rotor 13, to prevent the current from flowing to the washing shaft 4, accidents caused by negligence of safety is prevented.

In the meantime, on the rear wall 200 of the tub 2, there is a hub 201 for inserting the bearing housing 7 therein in injection molding of the tub, and on an outer side of the hub 201, there are fastening bosses 202 formed in a circumferential direction at regular intervals for fixedly securing the stator 14 to the rear wall 200 of the tub 2 with fastening members 15a.

Between the rear wall 200 of the tub 2 and the stator 14, there is a supporter 17 having a shape almost the same with a contour of the rear wall 200 of the tub for securing to the rear wall 200 of the tub at the time of mounting the stator 14, for supporting the stator 14, and maintaining concentricity of the stator 14.

The supporter 17 has a front side in close contact with an inner side of a rib 203 on the rear wall 200 of the tub, and a rear side in close contact with an outside circumference of a rear end of the bearing housing 7, not surrounded by, but exposed from the hub 201 at the center of the rear wall 200 of the tub.

For coupling the supporter 17 and the rear wall 200 of the tub together, a plurality of fastening members 15d are fastened to an inner side of an outside circumferential surface of the supporter 17, and fastened to the hub 204 on the rear wall of the tub. In order to secure the stator 14 to the supporter 17, other fastening members 15a are used on an inner side of a circumferential direction of the fastening members 15a.

Figure 8:
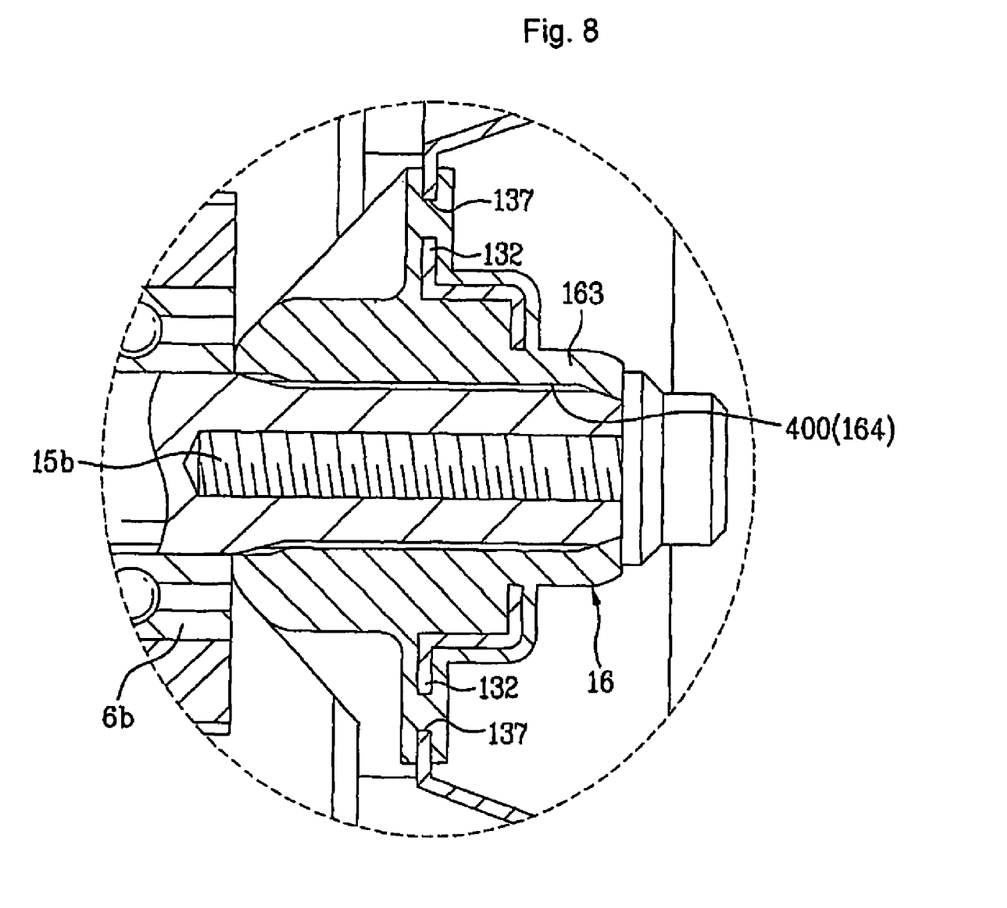
FIG. 8 illustrates an enlarged view of a longitudinal section of key parts of a driving unit in a drum type washing machine in accordance with another preferred embodiment of the present invention.

In the meantime, referring to FIGS. 3 and 8, the stator 14 of the motor 5 includes a ring shaped frame 140, and a coil 142 wound on a winding portion on an outer side of the frame 140, with fastening ribs 143 formed on an inner side of the frame 140 as one body for securing the stator 14 to the rear wall 200 of the tub.

The operation of the drum type washing machine of the present invention will be described.

When the rotor 13 starts to rotate as a current flows to the coils 142 on the stator 14 in a sequence under the control of a motor driving controller (not shown), the washing shaft 4 coupled to the connector 16 which is formed as one body with the rotor by insert molding, with the serration rotates, to transmit rotation force from the rotor to the drum through the washing shaft 4 accordingly, to rotate the drum 3.

In the meantime, the drum type washing machine having the driving unit of the present invention applied thereto has the following operation.

The formation of the tub 2 of a plastic having a good heat resistance is light and has a good processability as the tub 2 is injection molded.

The formation of the bearing housing 7 of a metal, such as an aluminum alloy, enables to apply even to a drum type washing machine having a drying course as the bearing housing 7 has no deformation at a high temperature.

The bearing housing of metal inserted in the hub 200 of the rear wall 200 of the tub at the time of injection molding of the tub 2 of plastic so as to be one unit with the tub 2 enables to omit a separate step of mounting the bearing housing 7 on the rear wall of the tub 200.

Accordingly, an assembly process can be simplified further, to reduce man-hours required for assembly.

The "]" shaped step 8a at the front side of the inside circumferential surface of the bearing housing 7 and the "[" shaped step at the rear side thereof enable to support the rear end of the front bearing 6a, and the front end of the rear bearing 6b.

That is, the steps 8a, and 8b on opposite sides of the inside circumferential surface of the bearing housing of metal can support the bearings 6a, and 6b without falling off the bearing housing 7.

Moreover, the positioning steps 9a, and 9b on a front, and a rear outside circumferential surface of the washing shaft 4 mounted in the bearing housing 7 for power transmission from the motor 5 to the drum 3 permits an easy positioning of the front bearing 6a and the rear bearing 6b at the washing shaft 4.

In the meantime, the securing of the front end of the washing shaft 4 to a spider 10 on the rear wall of the drum 3, and the brass bushing 11 press fit on a region of the washing shaft 4 starting from an exposed portion of the washing shaft 4 in rear of the spider 10 to the front bearing 6a for preventing the washing shaft 4 from rusting permit to prevent the washing shaft 4 from rusting.

The sealing member 12 on an outer side of the bushing 11 prevents infiltration of water toward the bearing.

The rotor 13 of the direct drive motor 5 is coupled to a center of a rear end portion of the washing shaft 4, and the stator 14 is on an inner side of the rotor 13, wherein the rotor 13 has a sidewall 13b extended forward from a circumference of a rear wall 13a, having a bent portion formed along a circumferential direction, with a seating surface 130 for supporting magnets 13c mounted on an inside circumferential surface of the side wall 13a, thereby permitting an easy fabrication of the rotor.

The hub 132 at a center of the rear wall 13a of the rotor 13, with pass through holes 131 formed therein enables to pass thread portions of fastening members 15b, such as bolts, to couple the rotor 13 to the washing shaft 4, and the plurality of cooling fins 133 formed each with a predetermined length in a radial direction blow air toward the stator 14 when the rotor 13 is rotated to cool down heat from the stator 14.

The cooling fins 133 are formed by lancing in a direction of an opened portion of the rotor 13, and the pass through holes 134 formed by the lancing serve as vents.

The rotor 13 of steel plate formed preferably by pressing reduces a time period required for fabrication of the rotor 13 significantly, thereby improving productivity.

Along with this, the connector formed as one body with the rotor by the insert molding, to omit a step for assembling the connector and the rotor together additionally, enables to improve productivity of fabrication of the rotor.

The connector 16, formed as one body with the rotor by insert molding thus, with a vibration mode different from the rotor 13 of metal, preferably steel plate, attenuates the vibration from the rotor 13 before transmission of the vibration to the washing shaft 4.

Since the connector 13 formed of resin, an insulating material, and as one body with the rotor 4 is between the rotor 4 and the washing shaft 4 which is in general formed of metal, to insulate between the rotor 4 and the washing shaft 4, accidents caused by negligence of safety are prevented to protect users.

In the meantime, the engagement of the serration 164 on the inside circumferential surface of the hub 163 of the connector 16 with the serration 400 on the rear end portion of the washing shaft 4 permits transmission of a rotation force from the rotor 13 to the washing shaft 4 through the connector 16 as it is.

The reinforcing ribs 161 on the outer side of the hub 163 of the connector 16 reinforce strength of the connector.

In the meantime, the embossed portions 135 between every adjacent cooling fins 133 on the rear wall 13a of the rotor 13 improve an overall rigidity of the rotor 13, and the drain hole 136 in the embossed portion 135 enables draining of water.

The fastening bosses 202 on an outer side of the hub 201 in a circumferential direction at regular intervals permits to secure the stator 14 to the rear wall 200 of the tub 2.

The supporter 17 between the rear wall 200 of the tub 2 and the stator 14, having a shape almost the same with a contour of the rear wall 200 of the tub for securing to the rear wall 200 of the tub at the time of mounting the stator 14 supports, and maintains concentricity of the stator 14.

That is, once the supporter 17 is fastened to the supporter fastening bosses 204 on the rear wall 200 of the tub with the fastening members 15a, an outer side of the supporter 17 is in close contact with the inner side of the rib 203 on the rear wall 200 of the tub, and the inner side of the supporter 17 is in close contact with the outside circumference of the rear end of the bearing housing 7, not surrounded by, but exposed from the hub 201 at the center of the rear wall 200 of the tub, to support, and maintain concentricity of the stator 14.

MODE FOR INVENTION

Another embodiments of the present invention will be described with reference to the attached drawings FIGS. 8 and 9.

FIG. 8 illustrates an enlarged view of a longitudinal section of key parts of a driving unit in a drum type washing machine in accordance with another preferred embodiment of the present invention.

Referring to FIG. 8, the direct drive motor includes a stator 14 having a winding portion with coils wound thereon, a rotor 13 fixedly connected to a washing shaft 4 for driving a drum directly, having a side wall 13b and a rear wall 13a formed as one body by pressing of steel plate, with a pass through hole 131 at a center of the rear wall, and a connector 16 of resin insert molded with the rotor as one body with the rotor such that the connector 16 is bonded to an inner, and outer sides of the rotor including communication holes 137 in the rear wall 13a of the rotor, and fixedly connected to the washing shaft for connecting the rotor and the washing shaft and supporting the washing shaft.

That is, in insert molding of the connector 16 with the rotor 13, the resin is not only filled in the communication holes 137, but also covers neighborhood of the pass through hole 131 of the rotor.

Therefore, formation of the connector and the rotor as one body thus enables bonding between the connector and the rotor more stronger.

Figure 9:
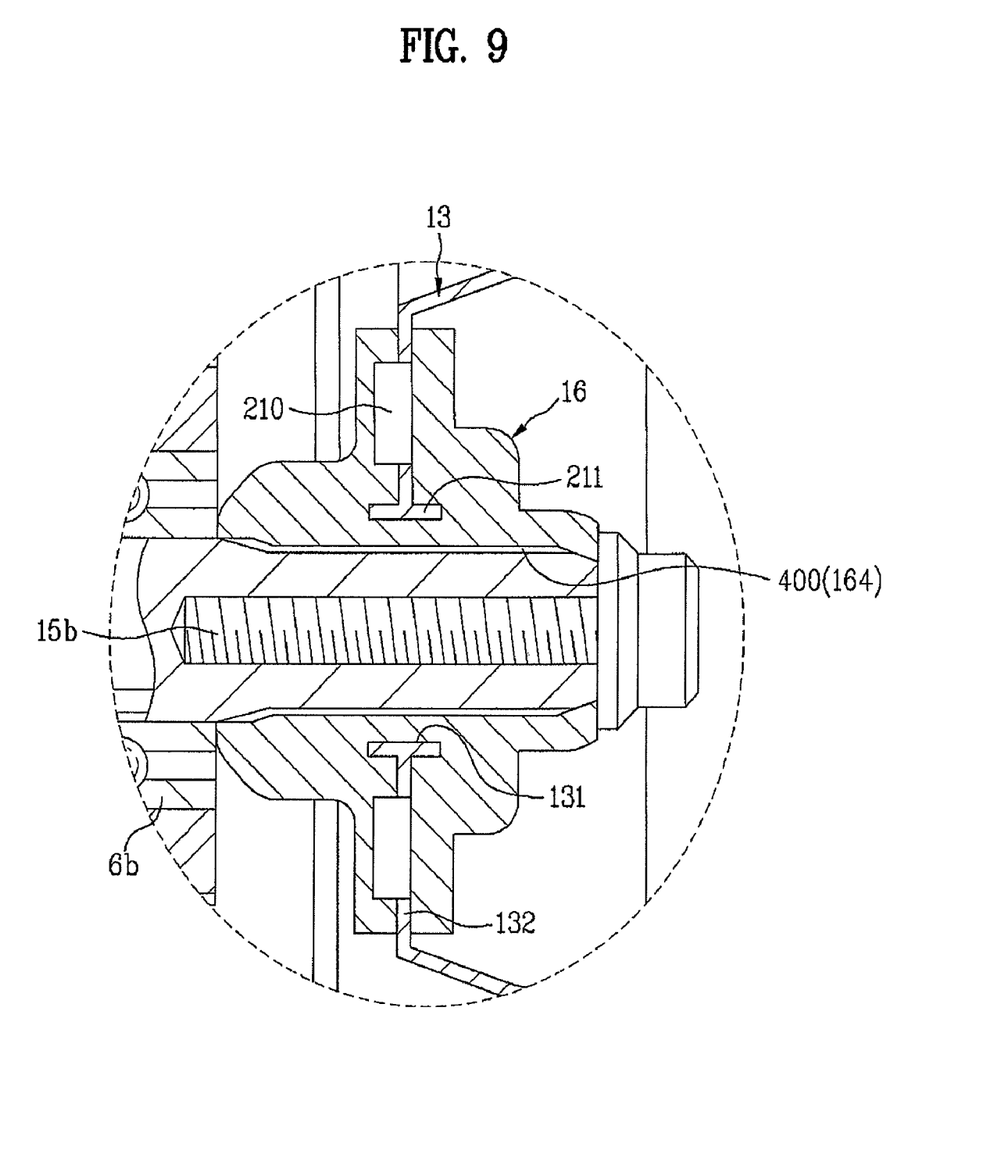
FIG. 9 illustrates an enlarged view of a longitudinal section of key parts of a driving unit in a drum type washing machine in accordance with another preferred embodiment of the present invention.

In the meantime, FIG. 9 illustrates an enlarged view of a longitudinal section of key parts of a driving unit in a drum type washing machine in accordance with another preferred embodiment of the present invention, identical to the foregoing embodiment except that the rotor 13 includes bonding pieces.

That is, different from other embodiments, separate from the pass through hole 131 and the communication holes 137 in the rotor, the rotor includes bonding pieces 210, and 211 projected in a length direction of the washing shaft. The direction of the projection may be a front direction or a rear direction in the length direction.

It is preferable that at least one bonding piece 210 is formed at the hub, and preferably at the pass through hole 131. Of course, both of the bonding pieces 210, and 211 may or may not be formed.

In a structure in which the rotation force is transmitted from the rotor 13 to the washing shaft 4 through the connector 16, the bonding between the rotor 14 and the connector 16 become stronger through the bonding pieces 210, and 211.

In the meantime, though not shown, of course, instead of the communication holes in the rotor, the insert molding may be made such that the resin covers front and rear surfaces of neighborhood of the pass through hole of the hub of the rotor.

The present invention is not limited to the embodiments, but there may be variations in dimensions, shapes, and materials as far as the variations are outside of scope of the present invention.

INDUSTRIAL APPLICABILITY

The direct drive motor in a washing machine of the present invention permits to provide a drum type washing machine having less noise, faults, and power loss, improve workability at the time of fabrication of the rotor, and reduce vibration from the rotor.

Moreover, the rotor of steel plate enabling pressing with good processability to require a shorter fabrication time period permits to provide a drum type washing machine having an improved productivity, the connector having a vibration mode different from the rotor permits to reduce vibration from the rotor to the washing shaft, and the supporter supports and maintains concentricity of the stator, effectively.

The invention claimed is:

1. A direct drive motor in a washing machine comprising:
a stator having a winding portion with coils wound thereon;
a rotor fixedly connected to a washing shaft for direct drive of a drum, the rotor having a sidewall, and a rear with a pass through hole at a center; and
a connector of a material having a vibration mode different from the washing shaft, insert molded at the center of the rear wall of the rotor to form one body with the rotor, and fixedly connected to the washing shaft to connect the rotor to the washing shaft, and support the washing shaft,
wherein the rotor has a bonding piece for enhancing bonding forces between the connector and the rotor at the time of insert molding of the connector.

2. The direct drive motor as claimed in claim 1, wherein the rotor is constructed of steel plate by pressing to form the side wall and the rear wall as one body.

3. The direct drive motor as claimed in claim 2, wherein the pass through hole at a center of the rear wall of the rotor is formed at a center of a hub which is a portion projected in a stator side or in a direction opposite thereto with respect to neighboring surface.

4. The direct drive motor as claimed in claim 3, wherein the washing shaft is formed of metal, and the connector is formed of resin which insulates between the washing shaft and the rotor.

5. The direct drive motor as claimed in claim 4, wherein the connector includes a serration on an inside circumferential surface having a shape in conformity with a shape of a serration at a rear end portion of the washing shaft.

6. The direct drive motor as claimed in claim 5, wherein the connector further includes reinforcing ribs for reinforcing a strength of the connector.

7. The direct drive motor as claimed in claim 4, wherein the rotor includes at least one communication hole in a neighborhood of the pass through hole for enhancing bonding force between the connector of resin and the rotor.

8. The direct drive motor as claimed in claim 7, wherein the connector is insert molded in the rotor such that the connector covers an inside of the pass through hole and front and rear surfaces of neighborhood of the pass through hole of the rotor.

9. The direct drive motor as claimed in claim 7, wherein the pass through hole in the rotor has the bonding piece projected in a length direction of the washing shaft for enhancing the bonding forces between the connector of resin and the rotor.

10. The direct drive motor as claimed in claim 4, wherein the rear wall has the bonding piece around the pass through hole in the rotor, the bonding piece projected in a length direction of the washing shaft for enhancing the bonding forces between the connector of resin and the rotor.

11. A direct drive motor in a washing machine comprising:
a stator having a winding portion with coils wound thereon;
a rotor fixedly connected to a washing shaft for direct drive of a drum, the rotor having a sidewall, and a rear wall formed as one body by pressing steel plate, with communication holes in the rear wall and a pass through hole at a center of the rear wall; and
a connector of resin insert molded such that the connector is bonded on inner, and outer sides of the rear wall of the rotor including the communication holes therein to form one body with the rotor, and fixedly connected to the washing shaft to connect the rotor to the washing shaft, and support the washing shaft, wherein the rotor has a bonding piece for enhancing bonding forces between the connector and the rotor at the time of insert molding of the connector.

12. The direct drive motor as claimed in claim 11, wherein the washing shaft is formed of metal, and the connector is formed of resin which insulates between the washing shaft and the rotor.

13. The direct drive motor as claimed in claim 12, wherein the connector includes a serration on an inside circumferential surface having a shape in conformity with a shape of a serration at a rear end portion of the washing shaft.

14. The direct drive motor as claimed in claim 13, wherein the connector further includes reinforcing ribs for reinforcing a strength of the connector.

15. The direct drive motor as claimed in claim 11, wherein the rotor includes at least one communication hole in a neighborhood of the pass through hole for enhancing bonding force between the connector of resin and the rotor.

16. The direct drive motor as claimed in claim 11, wherein the pass through hole in the rotor has the bonding piece projected in a length direction of the washing shaft for enhancing the bonding forces between the connector of resin and the rotor.

17. The direct drive motor as claimed in claim 11, wherein the rear wall has the bonding piece around the pass through hole in the rotor, the bonding piece projected in a length direction of the washing shaft for enhancing the bonding forces between the connector of resin and the rotor.

18. A direct drive motor in a washing machine comprising:
a stator having a winding portion with coils wound thereon;
a rotor of magnetic metal fixedly connected to a washing shaft of metal for direct drive of a drum, the rotor having a sidewall, and a rear wall with a pass through hole at a center; and
a connector of resin for insulating between the washing shaft and the rotor, insert molded at the center of the rear wall of the rotor to form one body with the rotor, and connecting the washing shaft to the rotor,
wherein the rotor has a bonding piece for enhancing bonding forces between the connector and the rotor at the time of insert molding of the connector.

19. The direct drive motor as claimed in claim 18, wherein the rotor includes at least one communication hole in a neighborhood of the pass through hole for enhancing the bonding forces between the connector of resin and the rotor.

20. The direct drive motor as claimed in claim 19, wherein the connector is insert molded in the rotor such that the connector covers an inside of the pass through hole and front and rear surfaces of neighborhood of the pass through hole of the rotor.

* * * * *